A. BRISBANE.
VEHICLE WHEEL.
APPLICATION FILED JAN. 26, 1910.
1,119,237.
Patented Dec. 1, 1914.
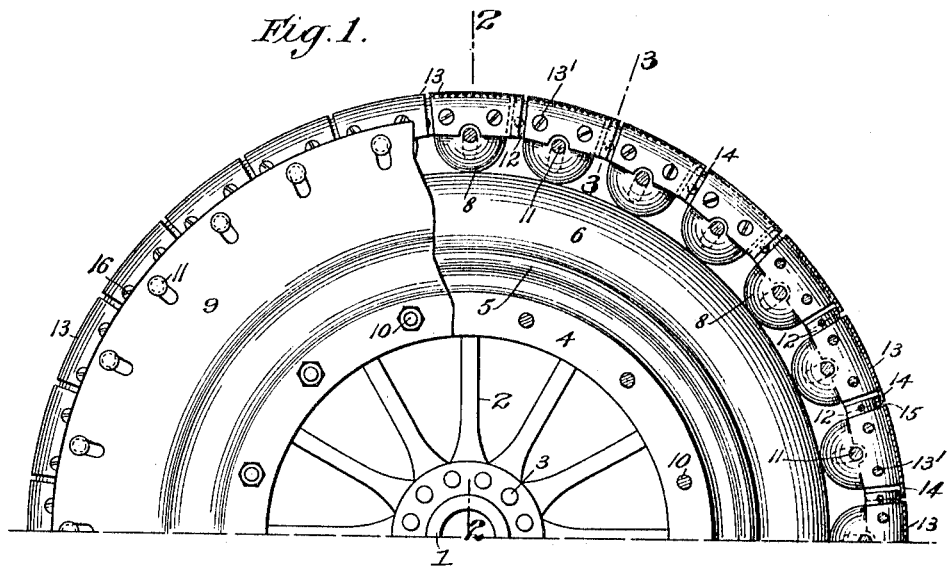
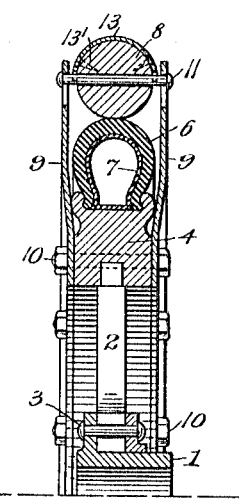
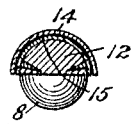
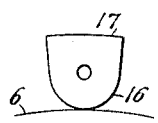 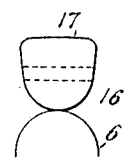
Witnesses:
Inventor:
Arthur Brisbane
by his Attys:

UNITED STATES PATENT OFFICE.

ARTHUR BRISBANE, OF NEW YORK, N. Y.

VEHICLE-WHEEL.

1,119,237.  Specification of Letters Patent.  Patented Dec. 1, 1914.

Original application filed May 4, 1907, Serial No. 371,872. Divided and this application filed January 26, 1910. Serial No. 540,148.

*To all whom it may concern:*

Be it known that I, ARTHUR BRISBANE, a citizen of the United States, residing at New York city, county of New York, and State of New York, have invented certain new and useful Improvements in Vehicle-Wheels, fully described and represented in the following specification and the accompanying drawings, forming a part of the same.

This application is a division of an application filed by me May 4, 1907, Serial Number 371,872, and this invention relates to certain improvements in vehicle wheels, and particularly to vehicle wheels known in the art as resilient wheels of that class in which the tread or tread surface of the wheel includes a plurality of tread members, these tread members forming the tread surface which comes into direct contact with the surface over which the wheel travels and prevents the pneumatic tube or shoe or other resilient element of the wheel from coming into direct contact with such surface, these tread members being so arranged as to have a limited movement toward and away from the shoe or other resilient element of the wheel so as to compensate for any unevenness in the surface over which the wheel travels. In such resilient wheels it is desirable that means be provided for preventing the entrance of dust and dirt between the tread members. It is also desirable that these tread members shall be of such form or configuration that the means employed for preventing the dust and dirt from entering between the same may be effective.

It is the object of the present invention to provide a construction in wheels of this type by which the dust and dirt may be prevented from entering between the tread members and to provide tread members of such configuration that the means employed may be effective.

Referring to the drawings which illustrate one embodiment of the invention:—

Figure 1 is a side view of half a wheel, certain parts being broken away and certain other parts being shown in section. Fig. 2 is a vertical section taken on line 2—2 of Fig. 1. Fig. 3 is a detail view partly in cross section, the section being taken on line 3—3 of Fig. 1. Figs. 4 and 5 are detail views showing a modified form of tread member.

Referring now to the drawings which illustrate the invention applied to an ordinary motor vehicle wheel, the numeral 1 indicates the hub of the wheel which is of ordinary construction to which spokes 2 are bolted at their inner extremities by bolts 3. The spokes 2 are secured at their outer extremities to the ordinary spoke rim or felly 4. This spoke rim or felly is, as is usual in such constructions, provided with a flange or rim 5 on which rim is fitted an ordinary pneumatic tire comprising an outer casing or shoe 6 and an inner tube 7, this shoe and tubing forming the resilient element of the wheel.

The improved tread or tread surface which comes into direct contact with the surface over which the wheel travels and which removes the pneumatic tube or shoe from direct contact with such surface includes a plurality of tread members, all or any one of which may be removed when injured. These tread members are composed of some suitable durable material and so arranged as to contact with the resilient element of the wheel and to have a limited movement toward and from such resilient element to compensate for any unevenness in the surface over which the wheel travels. The number of these tread members may obviously be varied, but a sufficient number will be provided and they will be sufficiently close together to form a practically continuous tread surface. In order that these tread members, which are marked 8, may have this limited radial movement with respect to the resilient element, there are provided, as shown, side plates 9, these side plates extending around the circumference of the wheel and being secured at their inner edges to the felly in any suitable manner, as for instance, by bolts 10, such means being advantageous as the side plates can be readily taken off from the wheel whenever it becomes necessary to get at the shoe or tube. These plates 9 are slotted at their upper extremities, in which slots are adapted to work bolts 11 by which the tread members 8 are carried and supported, the movement of the tread members with respect to the shoe or tubing being limited by the depth of the slots. These slots are so positioned in the plates, and tread members are of such dimensions that the upper edges of these tread members will always project beyond the edges of the plates so that the plates will not come in contact with the surface over which the wheel travels.

The means for preventing dust or dirt from entering between the tread members and the material and configuration of the tread members whereby such means are rendered effective may be somewhat varied. The tread members are preferably, because of cheapness, made of wood although metal or hard rubber or other suitable material may be employed if desired. In the particular construction illustrated in Fig. 1, these tread members are formed of wooden blocks, the lower portion of which, that is the portion which comes in contact with or bears on the shoe, is turned to a spherical shape so that such lower or bearing portion is circular and without any sharp corners or projections which would tend to injure the shoe or tube from any sudden and vigorous contact or otherwise, such construction having been found advantageous. The upper or tread portion of each of these tread members is not turned circular, but is of the configuration shown in Fig. 1, being turned semi-circular transversely to its length and projecting somewhat beyond the lower or bearing portion, this form permitting the members to be arranged so as to form a substantially continuous tread surface. On the upper or tread portion of the members 8 are formed shoulders 12, one of these shoulders being formed on one end of each tread member, as by cutting away the member at the desired point. Each member is covered or sheathed with some durable material, this covering in the particular construction shown, being a thin sheet of metal marked 13 secured to the member in any desired way as by screws 13′. This strip of material covers the upper or tread surface of the member extending down over the sides thereof below the upper edges of the side plates 9, and projecting slightly beyond the upper or tread surface and the sides of the members at the side or end opposite the shoulder, as shown at 14, so that it laps over on to the shoulder of the next succeeding member and protects the tread surface and side spaces between the members, as clearly shown in Fig. 1. A second strip of material 15 is or may be bent over the shoulders or projections 12 and extends down over the sides of the projections or shoulders, the second strip lying under the first strip on the shoulder, as shown in Fig. 3, and forming a wearing surface on which the strips 13 rub or wear. This construction of tread members provided with shoulders and sheathing strips arranged as described, effectually prevents the entrance of dust or dirt between the tread members. The sheathing strips 13 also tend to prevent the tread members from sliding or slipping when passing over a wet or slippery surface.

In Figs. 4 and 5 a modification of the tread members shown in Figs. 1 to 3 is illustrated. In this instance the tread members instead of having a circular lower or contact portion are shown as having such portion somewhat rounded off as shown at 16, and their upper or tread surfaces squared off, as shown at 17.

It will be understood that the same shoulder construction may and will be employed with tread members of the type shown in Figs. 4 and 5, these tread members being also provided with the sheathing strips hereinbefore described.

What I claim is:—

In a vehicle wheel, the combination with a spoke-rim or felly, of a resilient body supported by the felly and extending completely around the outer periphery thereof, a plurality of tread members forming the tread surface of the wheel and arranged to contact with said resilient body and having limited movement with respect thereto, such tread members having a rounded lower or contact portion and an upper portion provided with a shoulder at one end, sheathing strips, one for each member secured thereto and arranged to lap over on to the shoulder of the succeeding member, and bearing strips, one for each member secured on the shoulder thereof.

In testimony whereof, I have hereunto set my hand, in the presence of two subscribing witnesses.

ARTHUR BRISBANE.

Witnesses:
P. B. PHILIPP,
T. F. KEHOE.

Copies of this patent may be obtained for five cents each, by addressing the "Commissioner of Patents, Washington, D. C."